(12) United States Patent
Astle et al.

(10) Patent No.: US 11,794,136 B2
(45) Date of Patent: Oct. 24, 2023

(54) FILTER INTERCONNECT USING A CORRELATED MAGNET TORQUE DESIGN

(71) Applicant: KX Technologies LLC, West Haven, CT (US)

(72) Inventors: Robert Astle, Middlefield, CT (US);
William Li, Pittsburgh, PA (US);
Bruno Chima, West Haven, CT (US)

(73) Assignee: KX Technologies LLC, West Haven, CT (US)

( * ) Notice: Subject to any disclaimer, the term of this patent is extended or adjusted under 35 U.S.C. 154(b) by 0 days.

(21) Appl. No.: 17/331,862

(22) Filed: May 27, 2021

(65) Prior Publication Data
US 2021/0283536 A1 Sep. 16, 2021

Related U.S. Application Data

(62) Division of application No. 16/454,543, filed on Jun. 27, 2019, now Pat. No. 11,052,333.

(60) Provisional application No. 62/690,681, filed on Jun. 27, 2018.

(51) Int. Cl.
*B01D 29/96* (2006.01)
*B01D 35/157* (2006.01)
*B01D 35/06* (2006.01)

(52) U.S. Cl.
CPC ............ *B01D 29/96* (2013.01); *B01D 35/06* (2013.01); *B01D 35/1573* (2013.01); *B01D 2201/16* (2013.01); *B01D 2201/4061* (2013.01); *B01D 2201/4069* (2013.01); *B01D 2201/4092* (2013.01)

(58) Field of Classification Search
CPC .... B01D 29/96; B01D 35/06; B01D 35/1573; B01D 2201/16; B01D 2201/4061; B01D 2201/4069; B01D 2201/4092
See application file for complete search history.

(56) References Cited

U.S. PATENT DOCUMENTS

| | | | |
|---|---|---|---|
| 3,420,266 | A | 1/1969 | Downey |
| 3,521,216 | A | 7/1970 | Tolegian et al. |
| 5,527,450 | A | 6/1996 | Burrows |

(Continued)

FOREIGN PATENT DOCUMENTS

| | | |
|---|---|---|
| CN | 202212062 | 5/2012 |
| CN | 204099679 U | 1/2015 |

(Continued)

*Primary Examiner* — Liam Royce
(74) *Attorney, Agent, or Firm* — DeLio Peterson & Curcio LLC; Brian G. Schlosser

(57) ABSTRACT

A filtration system interconnection structure having manifold with a rotatable manifold magnet of correlated magnets, a shroud with alignment tracks, an actuating valve for water ingress, and a filter cartridge having a rotatable filter magnet of correlated magnets, where the manifold magnet and the filter magnet are in magnetic communication with one another when the filter cartridge is inserted with the shroud, and are at least partially rotatably compatible, where the manifold magnet rotates with the filter magnet until the manifold magnet experiences a rotational stop beyond a predetermined rotation of the filter magnet, thus allowing the filter magnet to shift polarity with respect to the manifold magnet and present a repulsion force for removal of the filter cartridge from the shroud.

9 Claims, 17 Drawing Sheets

(56) References Cited

U.S. PATENT DOCUMENTS

| | | | |
|---|---|---|---|
| 6,533,931 B1* | 3/2003 | Reid | B01D 35/31 |
| | | | 210/450 |
| 7,800,471 B2 | 9/2010 | Fullerton et al. | |
| 7,817,006 B2 | 10/2010 | Fullerton et al. | |
| 7,893,803 B2 | 2/2011 | Fullerton et al. | |
| 10,865,893 B2* | 12/2020 | Marks | F16K 3/26 |
| 2003/0042191 A1 | 6/2003 | Nam et al. | |
| 2007/0199876 A1* | 8/2007 | Tubby | B01D 35/306 |
| | | | 210/232 |
| 2008/0083668 A1 | 4/2008 | Caiozza | |
| 2010/0140521 A1 | 6/2010 | Burgess et al. | |
| 2010/0212259 A1 | 8/2010 | Knieling et al. | |
| 2017/0072347 A1 | 3/2017 | Schmoll | |
| 2019/0351352 A1 | 11/2019 | Chandra | |

FOREIGN PATENT DOCUMENTS

| | | |
|---|---|---|
| GB | 2116867 | 10/1983 |
| WO | 2012177850 | 12/2012 |

* cited by examiner

FILTER INTERCONNECT USING A CORRELATED MAGNET TORQUE DESIGN

BACKGROUND OF THE INVENTION

1. Field of the Invention

The present invention relates to the interconnection scheme between a filter cartridge and its corresponding manifold. The invention utilizes a correlated magnetism design that encompasses correlated magnets. The function of the correlated magnets in this application is twofold. First, a valve is actuated through rotation of the filter cartridge into the manifold; and second, a repulsion force is introduced upon filter cartridge rotation to assist in the filter cartridge removal from the manifold.

2. Description of Related Art

Correlated magnet designs were introduced in U.S. Pat. No. 7,800,471 issued to Correlated Magnetics Research, LLC on Sep. 21, 2010, titled "FIELD EMISSION SYSTEM AND METHOD" (the "'471 Patent"). This patent describes field emission structures having electric or magnetic field sources. The magnitudes, polarities, and positions of the magnetic or electric field sources are configured to have desirable correlation properties, which are in accordance with a predetermined code. The correlation properties correspond to a force function where spatial forces correspond to relative alignment, separation distance, and a spatial force function.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENTS (a related patent to the '471 Patent), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction force, while a misalignment will cause the various magnetic field emission sources to substantially cancel each other out. The spatial forces (attraction, repulsion) have a magnitude that is a function of the relative alignment of the two magnetic field emission structures, the magnetic field strengths, and their various polarities.

It is possible for the polarity of individual magnet sources to be varied in accordance with a code without requiring a holding mechanism to prevent magnetic forces from "flipping" a magnet. As an illustrious example of this magnetic action, an apparatus 1000 of the prior art is depicted in FIG. 1. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, when they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved relative to one another to become misaligned.

Generally, the precision within which two or more field emission structures tend to align increases as the number N of different field emission sources in each field emission structure increases, for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

An illustrious example of this coupling device is shown in FIG. 2, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

A description of the precision alignments of polymagnets is further described herein. As is well known, in conventional magnets the holding force is generally high even when the magnets are off center. This means they are likely going to attract in undesirable places, and they will generally have a high frictional force holding them in that position.

A polymagnet pair of the same nature as the conventional magnet discussed above, is designed and engineered to incorporate an alignment pattern, and will exhibit a strong peak force (the holding force) when the polymagnets are in alignment. When the magnets are moved out of alignment, the force drops off rapidly. Furthermore, at a predetermined offset, these magnets will actually start to repel. In a system designed with these magnets, the components will feel like they are floating until they are more closely aligned, at which point they will attach.

In this manner, there is very little positive holding force outside the region where there is a strong alignment force. This removes the possibility of attachment when the components are misaligned.

Baker correlation codes are utilized to form the unique sequences of +1s and −1s in a function such that the two functions resonate strongly when aligned, and when shifted the resonance diminishes dramatically.

The present invention adapts the correlated (poly)magnet technology described above to an interconnection structure for a filter cartridge and a corresponding manifold.

SUMMARY OF THE INVENTION

Bearing in mind the problems and deficiencies of the prior art, it is therefore an object of the present invention to provide a "torque/align" model for a filter cartridge and manifold structure, which allows for one magnet on the filter cartridge to apply a torque to a non-contacting corresponding magnet on the manifold when they are in phase.

It is another object of the present invention to provide a filtration system incorporating correlated magnets for attachment, detachment, and primary function activation.

A further object of the invention is to provide a filtration system (manifold and cartridge) in magnetic communication where the magnets provide attraction and repulsion upon predetermined rotation positions relative to one another.

The above and other objects, which will be apparent to those skilled in the art, are achieved in the present invention which is directed to a filtration system comprising: a filter manifold having a rotatable manifold magnet, a mechanical stop in proximity to the manifold magnet, a valve, and a shroud; and a filter cartridge having housing body and a stem extending from a top portion of the housing body, and a filter magnet located on or within the stem; wherein the manifold magnet is attached to or housed within a rotatable structure having an extension or tab, such that the tab is in mechanical communication with the manifold mechanical stop at predetermined points of rotation of the manifold magnet, wherein the manifold magnet and the filter magnet are interconnected via magnetic communication with one another upon insertion of the filter cartridge into the shroud, and upon rotation of the filter cartridge, the manifold magnet rotates and is capable of actuating the valve to perform a primary function, such as turning ON or OFF fluid to the filter cartridge.

The manifold magnet is an array of correlated magnets having a first field emission structure.

The filter magnet is an array of correlated magnets having a second field emission structure.

The shroud includes a plurality of alignment tracks for receiving a filter boss that extends radially outwards from the filter cartridge housing, the alignment tracks governing the position of the filter cartridge upon rotation.

The manifold magnet includes a sheath extending over a surface of the manifold magnet, such that the manifold magnet is separated from the filter magnet by a physical barrier, the sheath in proximity to the filter magnet when the filter magnet is inserted within the shroud.

The filter magnet polarity is aligned with the manifold magnet polarity an attraction force is realized between the filter magnet and the manifold magnet when the filter cartridge is initially rotated within the shroud.

The manifold magnet rotates with the filter magnet as the filter magnet rotates through approximately 90° in a first direction from an initial insertion position within the shroud.

The manifold magnet is prohibited from rotating with the filter magnet when the filter magnet rotates approximately 90° in a second direction from an initial insertion position within the shroud, such that the filter magnet polarity is no longer aligned with the manifold magnet polarity and a repulsion force is realized between the magnets to assist in filter cartridge extraction.

After rotation the filter cartridge is slidably removable from the manifold and shroud, and removal is assisted by the repulsion force.

Prohibition of rotation of the manifold magnet is achieved by having the tab abut the mechanical stop, such that the manifold magnet can no longer rotate with the filter magnet for rotation beyond the mechanical stop when the filter cartridge continues to be rotated.

The manifold magnet and the filter magnet each have respective field emission structures, wherein the manifold magnet field emission structure is configured to interact with the filter magnet field emission structure such that the manifold magnet and the filter magnet can be aligned to become attached (attracted) to one another or misaligned to become removed (repulsed) from one another, wherein the manifold magnet can be released from the filter magnet when their respective field emission structures are moved relative to one another to become misaligned.

In a second aspect, the present invention is directed to a manifold for a filtration system comprising: a rotatable manifold magnet comprising an array of correlated magnets; a valve for turning fluid ingress to the manifold ON or OFF; and a shroud having a plurality of predetermined alignment tracks on an inside surface for receiving a filter boss extending from a filter cartridge, such that the filter cartridge is guided upon insertion and extraction from the shroud by the alignment tracks.

The manifold magnet is supported on a rotatable structure, rotatable relative to the manifold.

In a third aspect, the present invention is directed to a filter cartridge comprising: a housing body, the filter housing body having a side surface, and top surface with a stem extending therefrom, and a filter boss extending radially outwards from the side surface; the stem including ingress and egress ports for fluid flow, and a filter magnet having a plurality of correlated magnets for magnetic interaction with complementary magnets on a manifold, the filter magnet positioned on a top surface of the stem or within the stem.

In a fourth aspect, the present invention is directed to a filter cartridge comprising: a housing body and a stem extending from a top portion of the housing body, the stem including a filter magnet having a surface in close proximity to a manifold magnet when the filter cartridge is inserted within the manifold, the housing body including a filter boss extending radially outwards from a housing outer surface; the filter boss aligned within an alignment track of a manifold shroud when the filter cartridge is inserted therein; the filter magnet having a plurality of correlated magnets forming a field emission structure in magnetic communication with the manifold magnet when the filter cartridge is fully inserted within the shroud.

In a fifth aspect, the present invention is directed to a filtration system comprising: a filter manifold having a manifold magnet, a switch valve, and a shroud; and a filter cartridge having housing body, a stem extending from a top portion of the housing body, a filter boss extending radially from the housing body, and a filter magnet located on or within the stem; wherein the manifold magnet and the filter magnet are interconnected via magnetic communication with one another upon rotatable insertion of the filter cartridge into the shroud, and upon rotation of the filter cartridge, the manifold magnet rotates and is capable of actuating the switch valve to perform a primary function, such as turning ON or OFF fluid to the filter cartridge.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
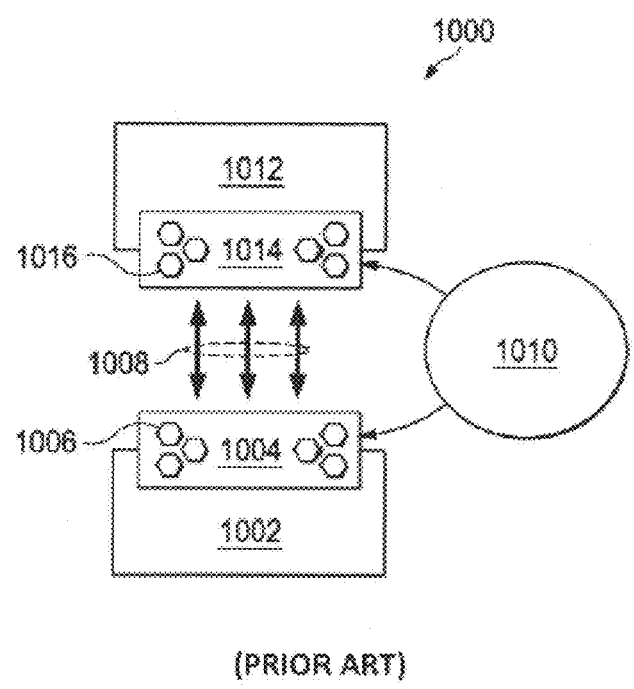
FIG. 1 depicts an apparatus of the prior art having two components magnetically attached to one another.
Figure 2:
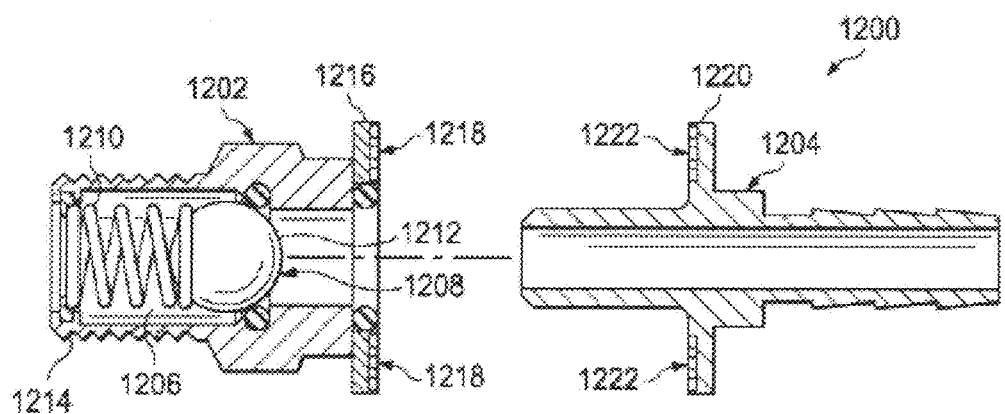
FIG. 2 depicts a quick connect air hose coupling of the prior art showing placement of correlated magnets for attachment.

In describing the preferred embodiment of the present invention, reference will be made herein to FIGS. 1-11 of the drawings in which like numerals refer to like features of the invention.

Correlated magnets contain areas of alternating poles. These codes of alternating poles can concentrate and/or shape magnetic fields to give matching pairs of magnets unique properties. The proposed design specifically uses a "torque/align" model, which allows for one magnet to apply a torque to a non-contacting corresponding magnet when they are in phase.

When the torque exceeds a maximum value either by application of excessive force or obstruction of the rotation of the connecting pair, the connecting pair components (each having a respective magnet) will have their magnets out of phase, and thus initiate a repulsion force against one another. The proposed design utilizes this property to attach a filter to a manifold, open and close a non-contacting valve (e.g., spool valve or other valve design) through rotation, and aid in filter removal by assisting in the ejection of the filter.

These features are accomplished by having at least a pair of magnets, preferably correlated magnets, oriented parallel to one another on each component of the connecting pair, wherein a first magnet is located on the top of a filter and a complementary magnet is located on the manifold designed to secure the filter into position. In at least one embodiment, a thin layer of material is introduced, physically separating the two magnets so they cannot have physical contacting surfaces, but they can still magnetically attract or repulse one another.

The function of the magnet located on the manifold is to assist in actuating a valve preferably through rotation (e.g., spool valve, cam and poppet valve, and other valve types). The manifold magnet is free to rotate, but restricted in rotational range. Preferably a ninety degree (90°) rotation is used to correspond to the open and closed positions of the valve; however, other ranges of rotation are possible and not prohibited. The filter cartridge magnet is also free to rotate with the rotating filter cartridge, and designed in an embodiment that ensures the filter cartridge will rotate further than the manifold magnet.

By way of example, when the manifold magnet is rotatable up to 90°, the filter cartridge magnet is designed to freely rotate to one hundred eighty degrees (180°). The filter cartridge magnet is designed to perform two functions. The first function is to apply torque to the manifold magnet (that is, bring the manifold magnet along in rotation) in order to actuate a valve. The second function is to work in conjunction with a mechanical stop to force the magnet pair out of phase to aid in filter removal.

During initial installation, the filter is guided by an alignment rail and boss system so that the correlated magnet on the filter top surface (filter magnet) and the corresponding correlated magnet on the manifold (manifold magnet) are aligned (in-phase forming an attraction force) but not in contact. The correlated magnet in the manifold actuates a valve when rotated 90°, said activation may be physically, electrically, or mechanically initiated.

When the filter is rotated the manifold magnet rotates along with it through attraction forces, and actuates the valve. Both the filter and manifold magnets are prevented from rotating past the point at which the valve is opened. To remove the filter, the filter is rotated in the counter-direction, bringing the manifold magnet along with it, at least partially along the rotational path, which causes the valve in the manifold to close. The magnet in the manifold is prevented from rotating past the closed position but the filter is free to "over-rotate", or in the exemplary embodiment, rotate an additional 90°. The "over-rotation" of the filter forces the magnets out of phase and produces a net repulsive force between the filter and the manifold which then aids in filter removal.

Figure 3A:
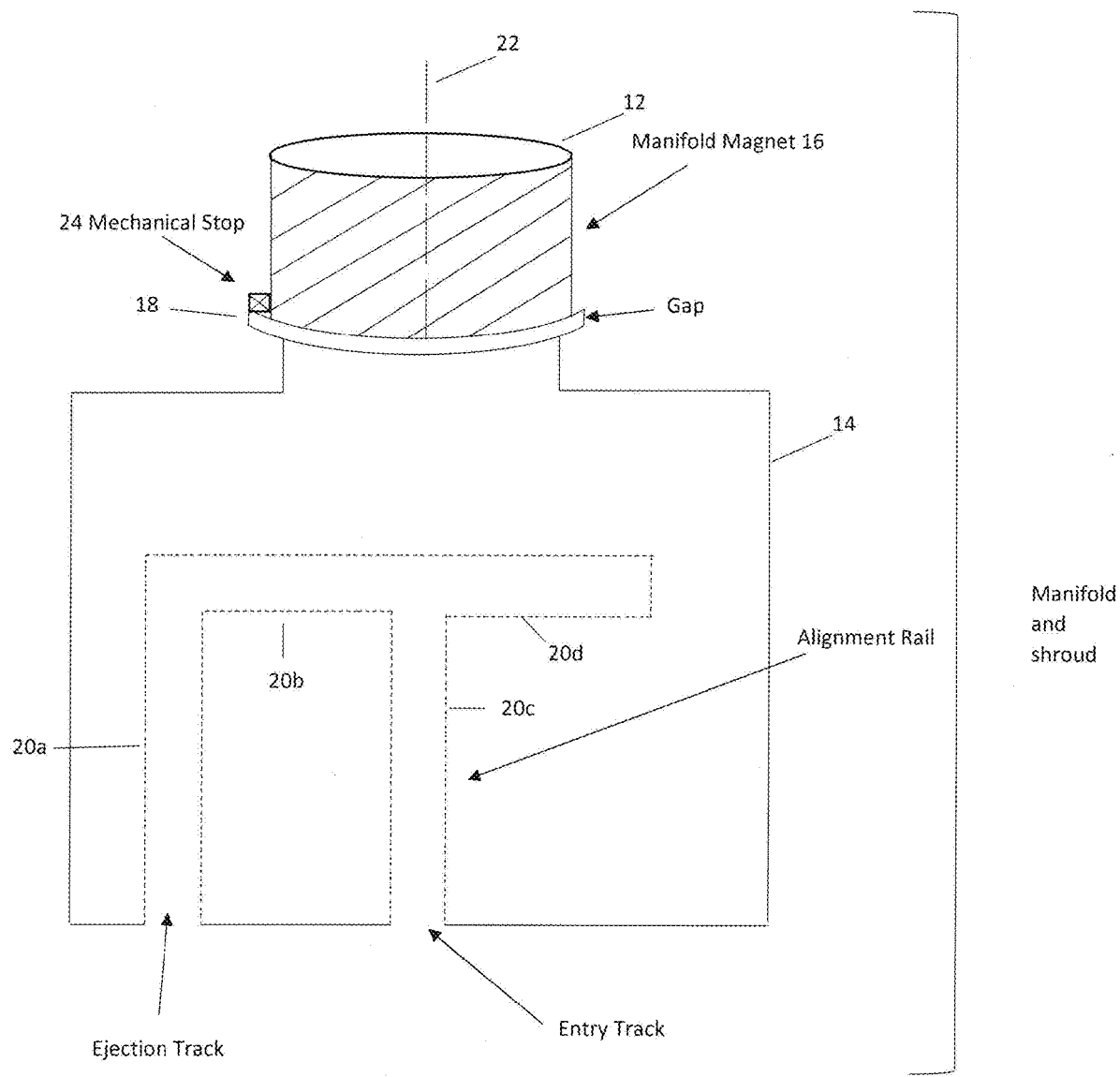
FIG. 3A depicts a cross-section of a portion of a manifold and a shroud or housing.

FIG. 3A depicts a cross-section of a portion of a manifold 12 with a shroud or housing 14. Manifold magnet 16 is situated at the top end of shroud 14. A separator 18, such as a plastic sheath, is attached below manifold magnet 16, which serves to form a gap between manifold magnet 16 and filter magnet 34 (not shown) when the filter cartridge 30 is inserted within shroud 14 and connected to manifold 12. This provides the physical separation between the manifold magnetic interconnection with the filter cartridge.

Manifold magnet 16 is rotatable about the center axis 22; however, for reasons discussed below, the rotation is purposely limited to be different than, and preferably less than, the rotational range of the rotatable filter magnet 34. A mechanical stop 24 on the manifold housing limits the rotation of the rotatable manifold magnet 16. In one embodiment, mechanical stop 24 limits and restricts the rotation of manifold magnet 16 to ninety degrees (90°). Other rotational restrictions are possible based on the placement of the mechanical stop, and the present invention is not limited to a ninety degree restriction.

Figure 3B:
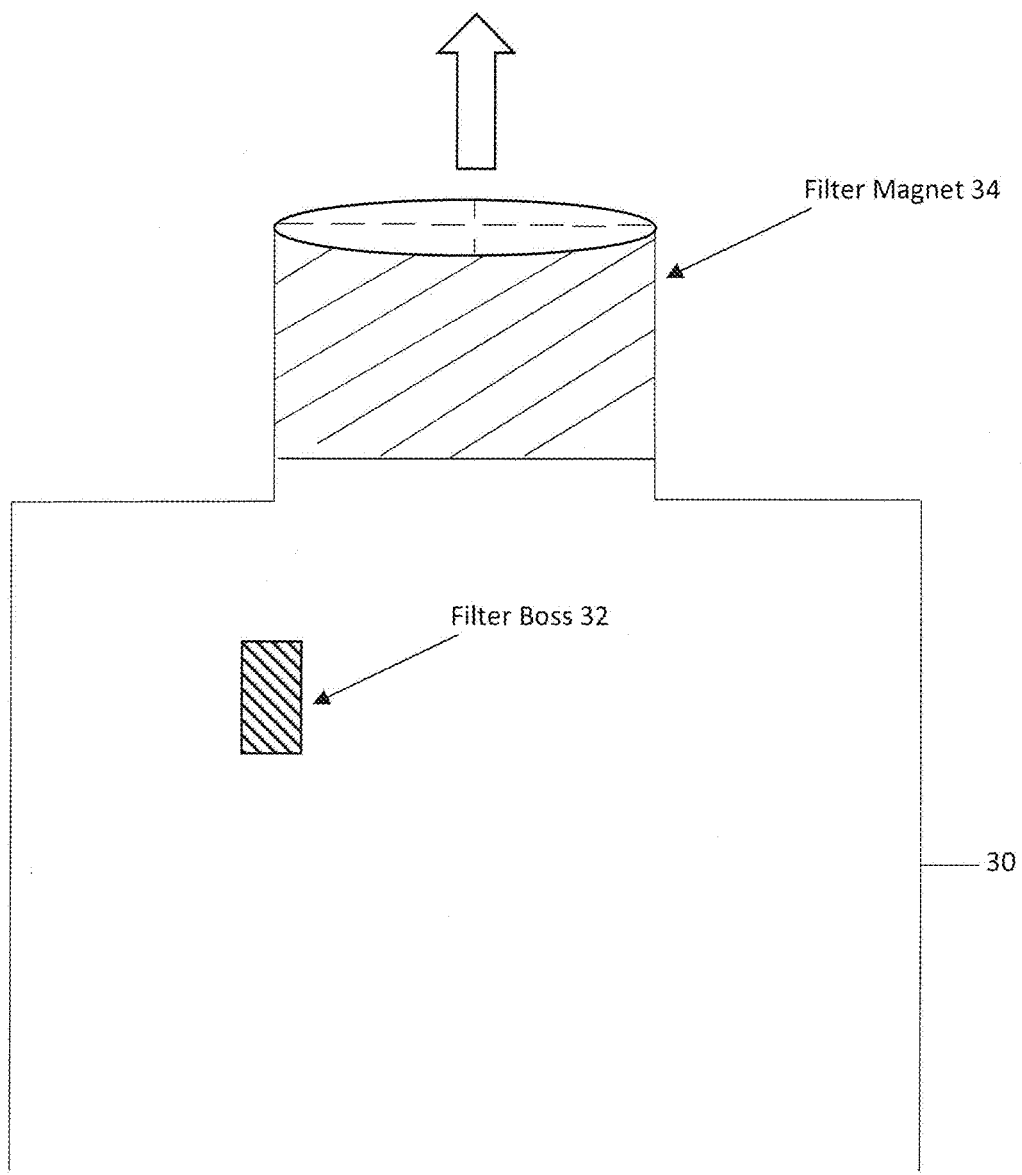
FIG. 3B depicts a shroud having alignment railings to steer a filter boss on the filter cartridge.

Shroud 14 includes alignment railings 20a-20d to steer a filter boss 32 which is shown on filter cartridge 30 of FIG. 3B. Alignment railings are preferably grooves embedded within shroud 14; however, other forms of alignment are possible and not precluded from the present design. For example, the alignment rails may form slots for a tongue-and-groove attachment to the filter cartridge boss, or form extended linear segments to receive a filter cartridge boss having a receiving slot.

Referring to FIG. 3B, which is a partial cross-sectional view of the filter cartridge 30, filter cartridge 30 includes a filter magnet 34 at the cartridge top end that is capable of rotation with respect to the axis of the filter cartridge. In this manner, the magnet may rotate concurrently with the cartridge rotation relative to the filter cartridge axis.

Alignment rail 20c on the manifold shroud 14 represents the "entry track" for filter cartridge 30 by receiving filter boss 32 when filter cartridge 30 is inserted within shroud 14. In this illustrative embodiment, filter boss 32 is an extended protrusion that extends in the radial direction outwards from the filter cartridge axial center.

Alignment rail 20d guides the filter boss 32 through rotation about the axial center of the filter cartridge 30. Alignment rail 20d directs the rotating position for filter boss 32 when filter cartridge 30 is fully inserted within shroud 14 and rotated such that filter boss 32 travels in alignment rail 20d to its end as its path partially circumvents the shroud's inner cavity. As will be shown in further detail below, this end rotational position of filter boss 32 within alignment rail 20d places the filter cartridge 30 in position for filtering operation.

Figure 4A:
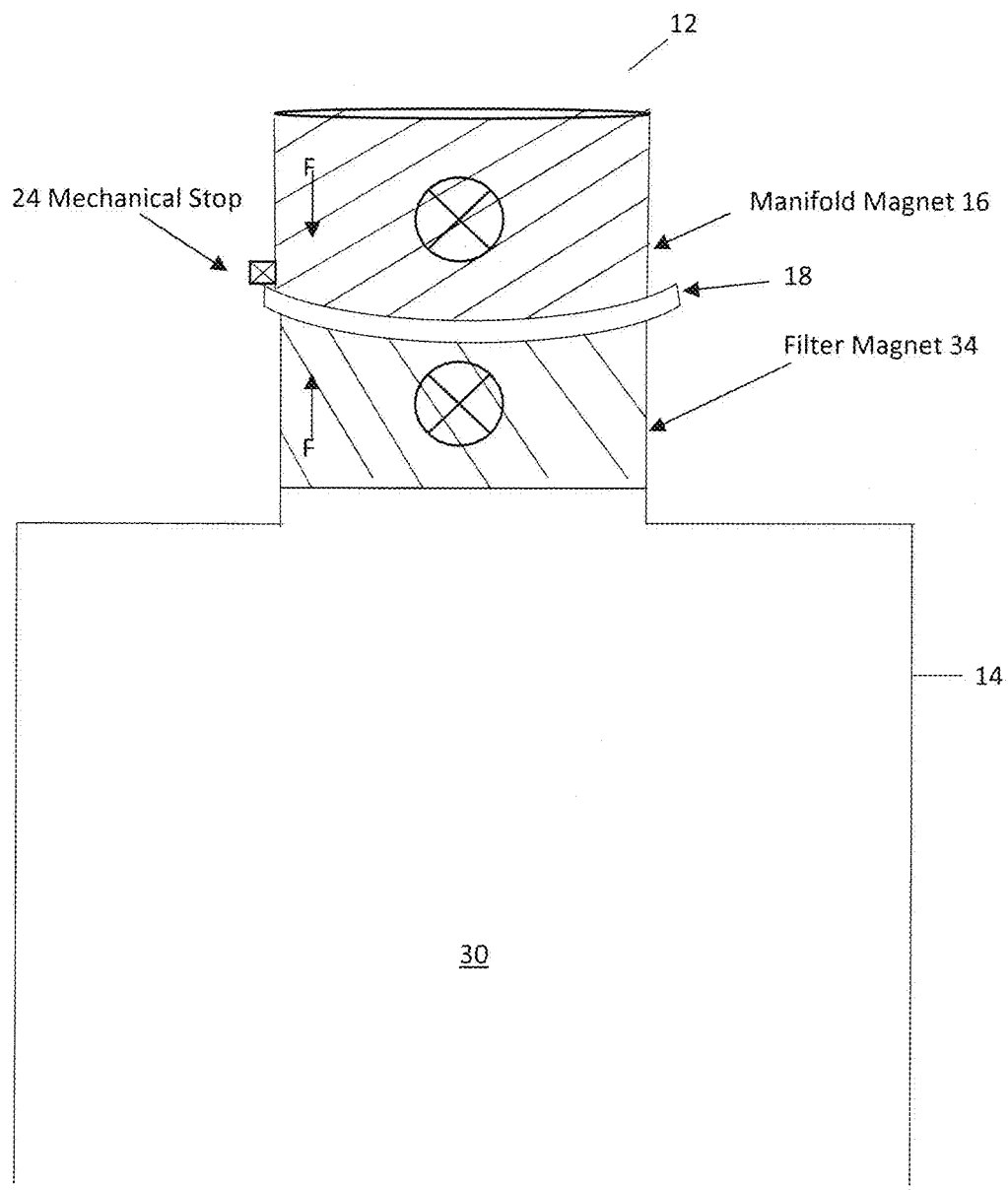
FIG. 4A depicts a cross-sectional view of a portion of the manifold of the present invention and the filter cartridge within the shroud, in a connected or INSTALLED position or state.

FIG. 4A depicts a cross-sectional view of a portion of a manifold 12 and filter cartridge 30 (within shroud 14) in a connected or INSTALLED position or state, where the manifold 12, specifically, manifold magnet 16, is magnetically attached and attracted to filter magnet 34. Manifold magnet 16 is shown above and in alignment with filter magnet 34. For exemplary purposes, the alignment is depicted by the position indicator ⊗ on each magnet. The magnets are physically separated by a sheath or layer of material 18, such as a plastic sheet, although other material types are certainly possible and not prohibited by the current design. The material of sheath 18 must be capable of allowing for magnetic attraction and repulsion forces to be transmitted therethrough, but allow for sliding rotation of the magnet surfaces.

Each magnet is a correlated magnet having a field emission structure. The manifold magnet field emission structure is configured to interact with the filter magnet field emission structure such that the magnets can be aligned to become attached (attracted) to one another or misaligned to become removed (repulsed) from one another. The manifold magnet can be released from the filter magnet when their respective field emission structures are moved relative to one another to become misaligned.

Figure 4B:
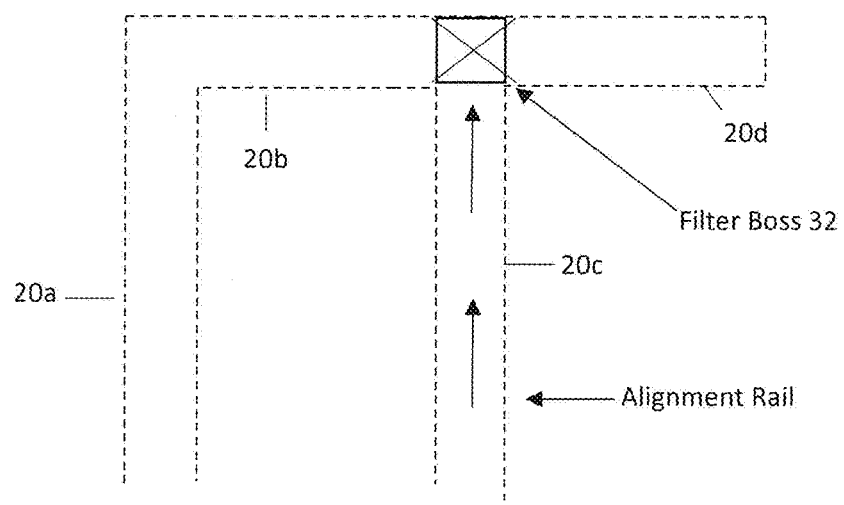
FIG. 4B depicts the INSTALLATION position of filter cartridge, when the filter cartridge is inserted within the shroud with the filter boss being aligned in a portion of the shroud's alignment rail.

This INSTALLATION position of filter cartridge 30 is achieved by inserting filter cartridge 30 within shroud 14 with filter boss 32 aligned in alignment rail 20c, as shown in FIG. 4B traversing to the topmost position in alignment rail 20c, and stopping at the top edge of alignment rail 20d. When in this position, filter cartridge magnet 34 and manifold magnet 16 share an attraction force "F" (depicted in FIG. 4A), which attaches the filter cartridge to the manifold.

FIG. 4B depicts a perspective view of the position of filter boss 32 within the alignment rail 20 on shroud 14 when filter cartridge 30 is in the process of being placed in the INSTALLED position.

Figure 4C:
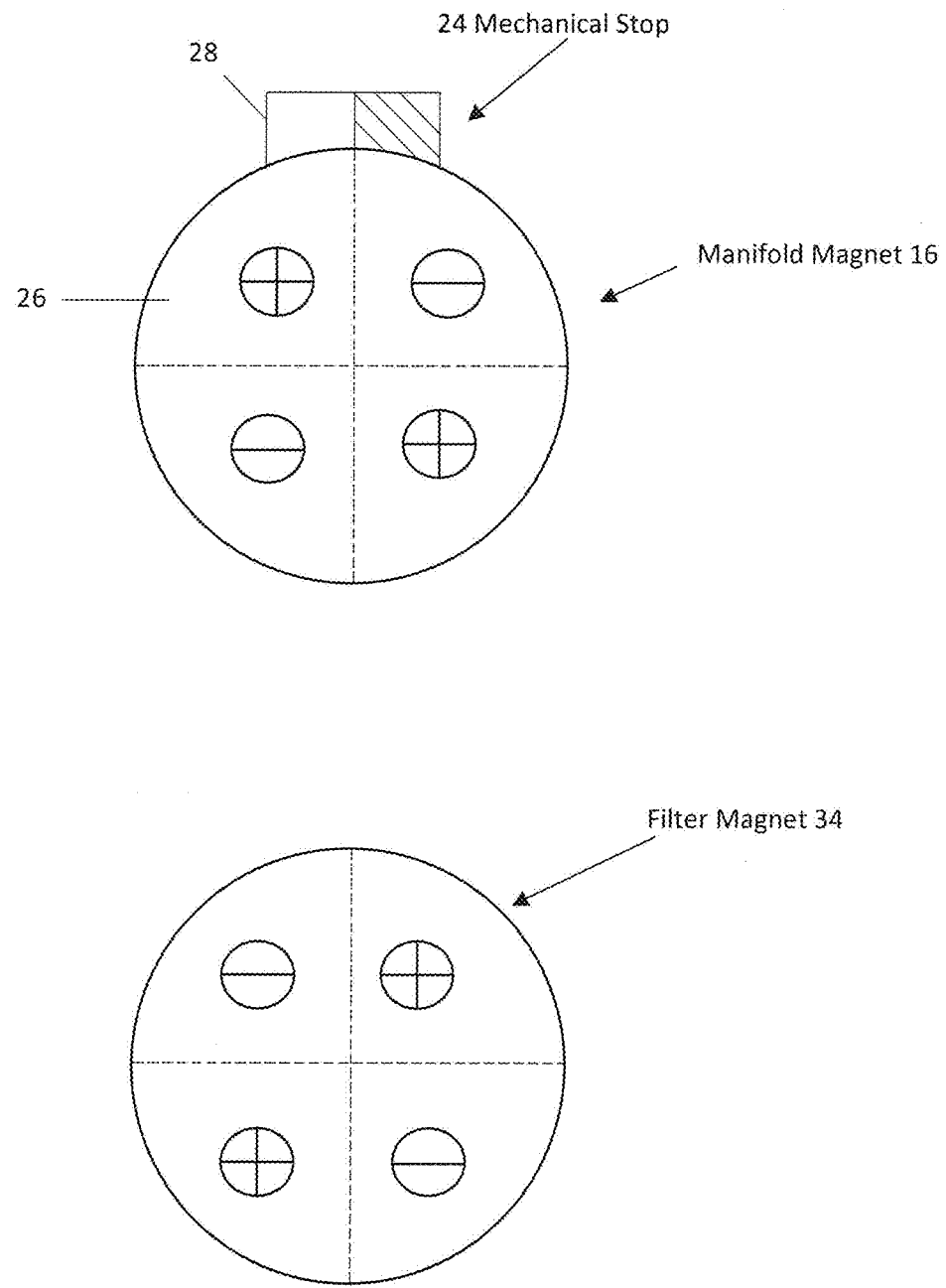
FIG. 4C depicts the polarity positions for the manifold magnet and filter magnet in the attracted or attached position.

Filter cartridge 30 is first inserted within the entry rail 20c of shroud 14 until it reaches the top most portion of the alignment rail. At this point the manifold magnet 16 and filter magnet 34 are oriented for full attraction. That is, the correlated magnets that form the manifold and filter magnets are in their respective, opposite polarities for maximum attraction force. FIG. 4C depicts the polarity positions for the manifold magnet 16 and filter magnet 34 in the attracted or attached position. The positive polarities of the manifold magnet, as shown in a bottom side view, are aligned with the negative polarities of the filter magnet, as shown in a top side view, putting the magnets "in-phase". In this position, manifold magnet 16, although now in attraction force with the filter cartridge magnet 34, has not yet been rotated, and as such, a valve (not shown) that would otherwise be actuated upon the manifold magnet's rotation remains in its OFF state.

As depicted in FIG. 4C, manifold magnet 16 is fixably attached to a rotatable structure, such as a disc 26, having a protrusion or tab 28 that moves with the rotation of the magnet. Tab 28 is designed to abut mechanical stop 24 in order to limit the range of rotation of manifold magnet 16. As shown in FIGS. 4B & 4C, when the filter cartridge 30 and filter boss 32 are inserted within alignment rail 20c, the magnets are in-phase, and mechanical stop 24 abuts, and is in contact with, tab 28.

Figure 5A:
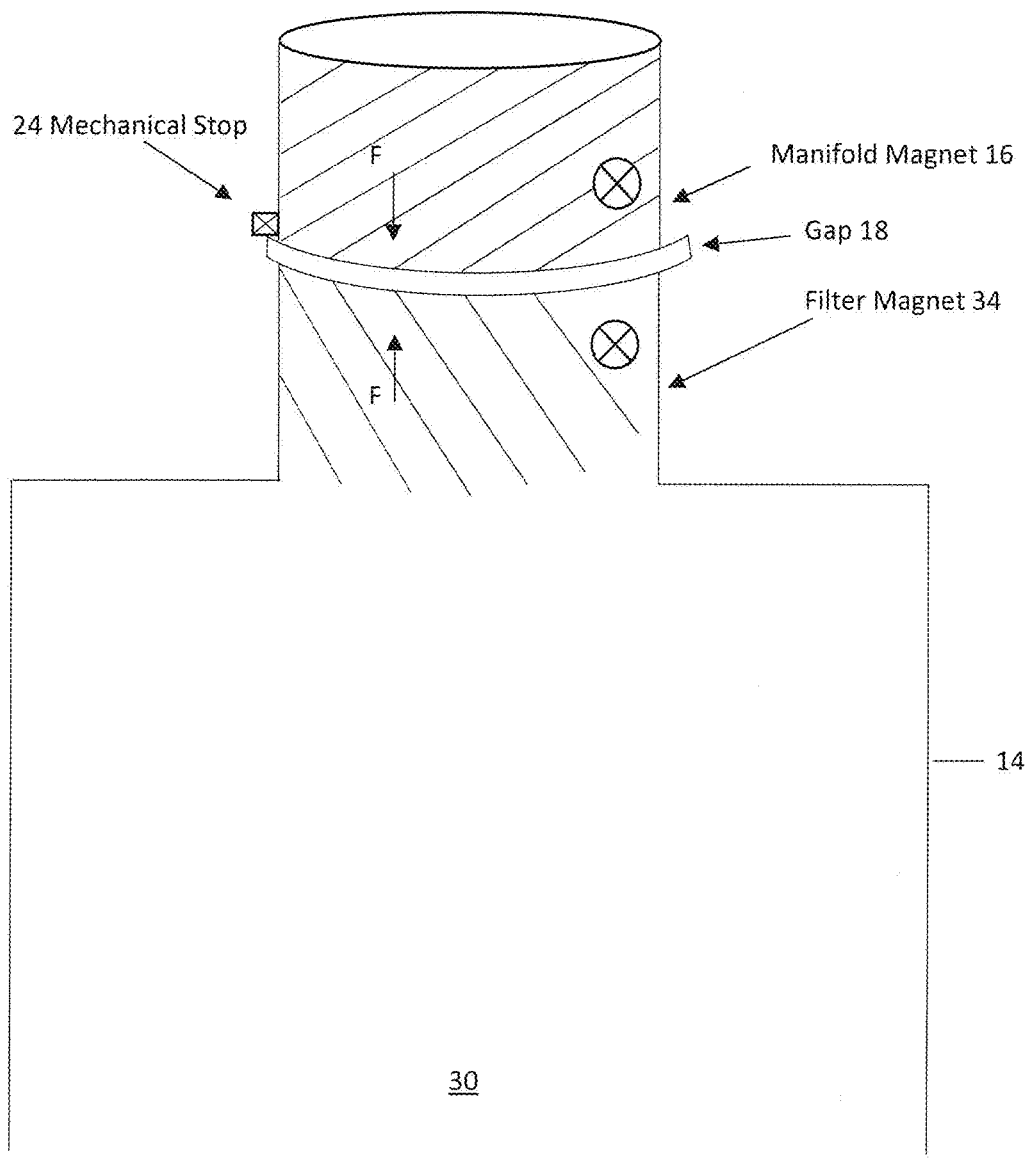
FIG. 5A depicts a new alignment position of the rotated filter cartridge using a position indicator ⊗ on each magnet.
Figure 5B:
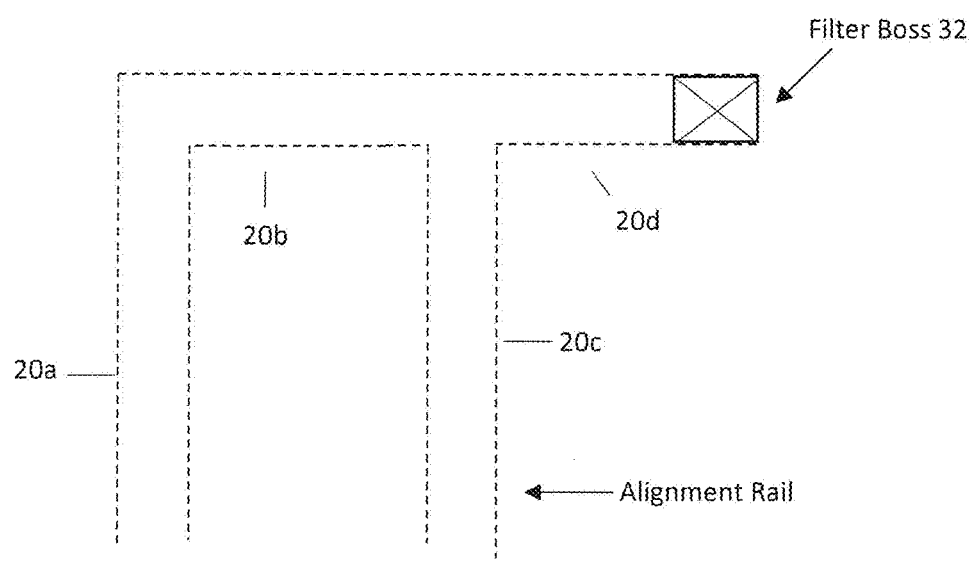
FIG. 5B depicts the position of the filter boss when the filter cartridge and manifold place the system in the ON state.

Once filter cartridge 30 is installed within shroud 14, and filter boss 32 is located at the topmost portion of alignment rail 20d, the cartridge is then rotated such that filter boss 32 slidably extends to one end of alignment rail 20d. Since manifold magnet 16 and filter magnet 34 are magnetically aligned in their "attracted" state, when filter cartridge 30 (and thus, filter magnet 34) is rotated, manifold magnet 16 on disc 26 is correspondingly rotated. This new alignment position is depicted by the position indicator ⊗ on each magnet (FIG. 5A), showing "attraction" alignment when filter boss 32 is at the end of alignment rail 20d. FIG. 5B depicts the location of the filter boss 32 within alignment rail 20d at this point of rotation.

Figure 5C:
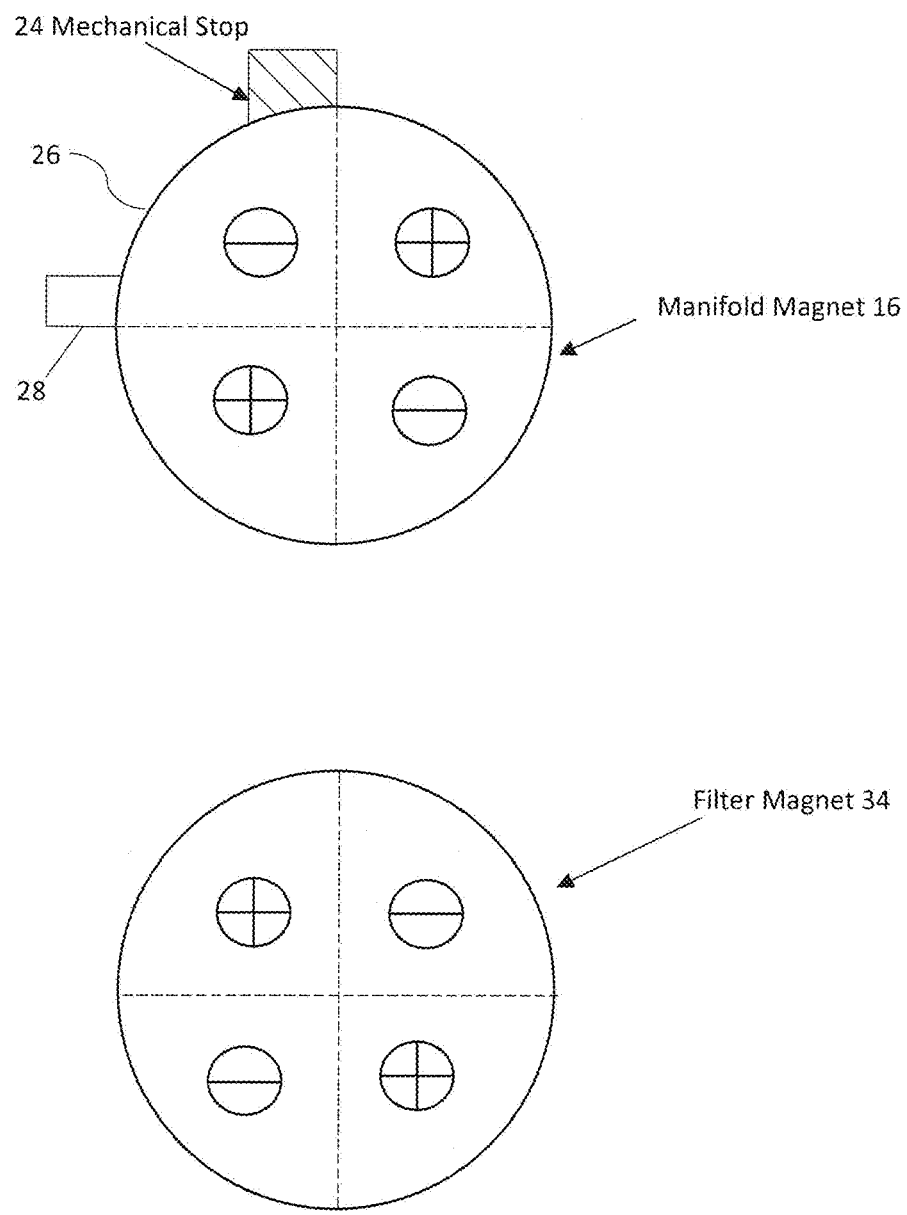
FIG. 5C depicts the attraction polarities of each magnet when the filter boss is at the end position of the alignment rail.

At this position point of the filter cartridge and filter manifold, respectively, resulting from the rotation of manifold magnet 16 concurrent with the rotation of the filter cartridge magnet 34, a valve is actuated and the system is placed in an "ON" state, where typically water is allowed to flow into the filter cartridge. FIG. 5C depicts the attraction polarities of each magnet when the filter boss 32 is at the end position of alignment rail 20d. The magnets remain in complete attraction mode as they are rotated concurrently and in unison. Tab 28 of manifold disc 26 is rotated away from mechanical stop 24. In this exemplary embodiment, tab 28 is ninety degrees (90°) away from mechanical stop 24. In other embodiments it is possible for the separation between tab 28 and mechanical stop 24 to be at a greater (or lesser) rotational distance.

Figure 6A:
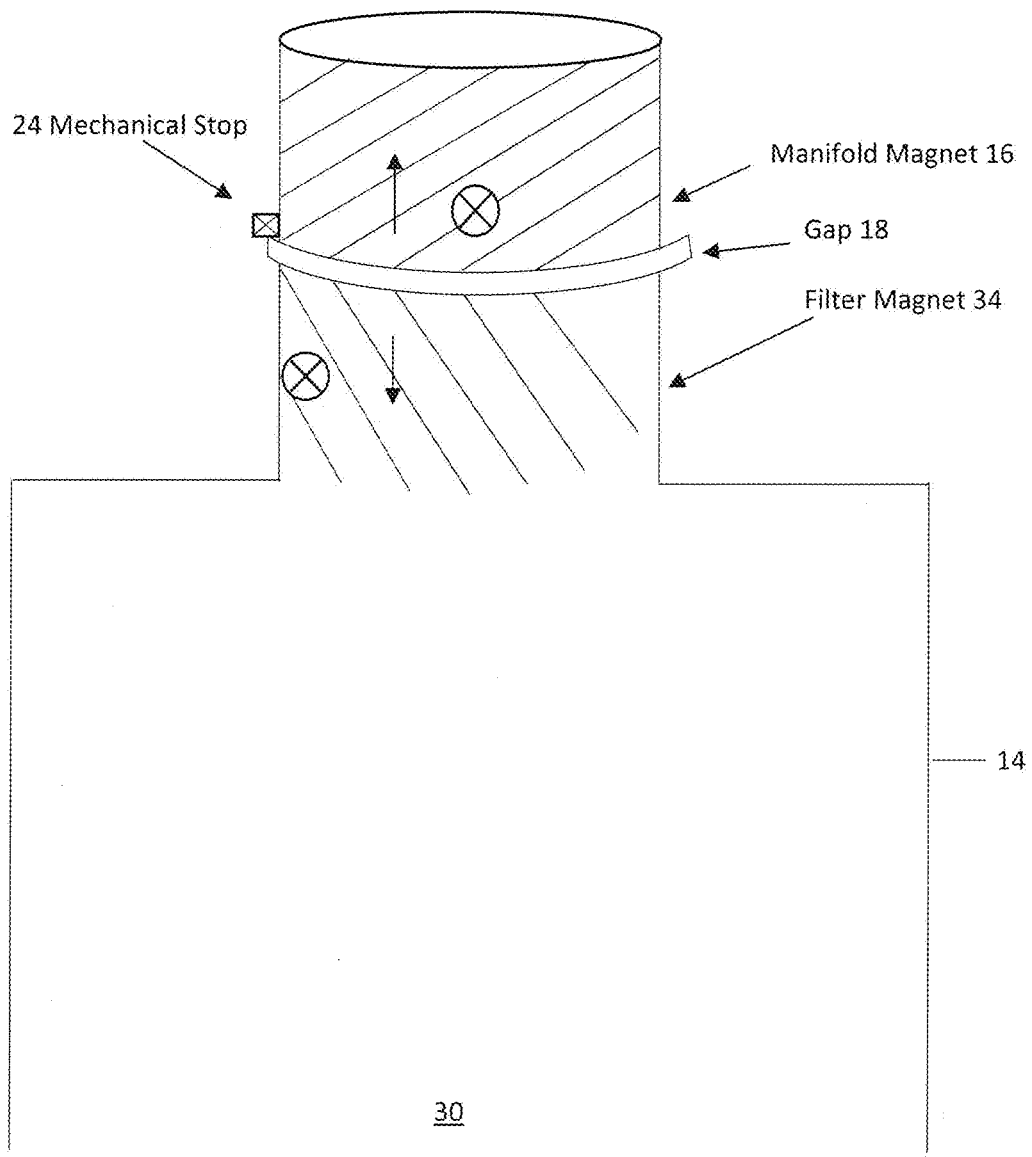
FIG. 6A depicts position indicators ⊗ out of phase with one another caused by the rotation of filter cartridge when filter boss is at an end point of the alignment rail for cartridge removal.
Figure 6B:
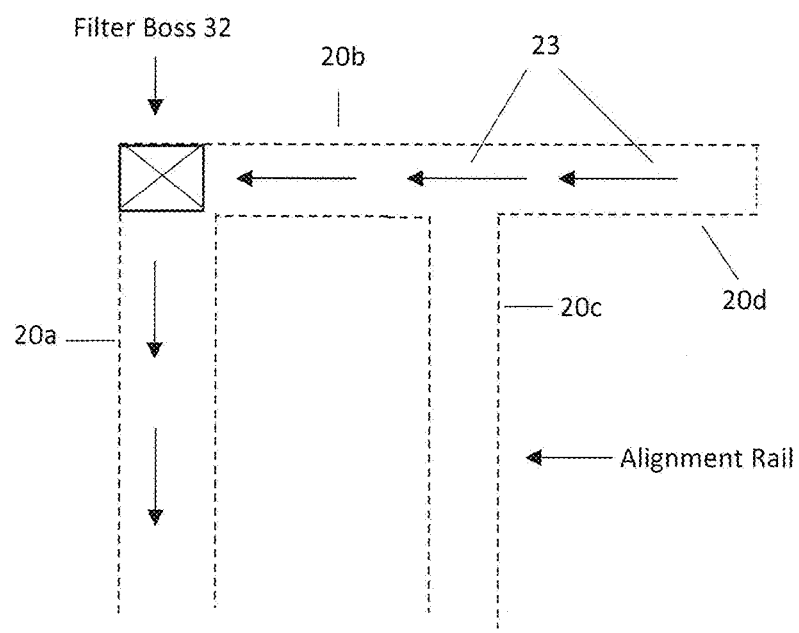
FIG. 6B depicts the filter boss at the end point of the alignment rail for EJECTION of the filter cartridge.
Figure 6C:
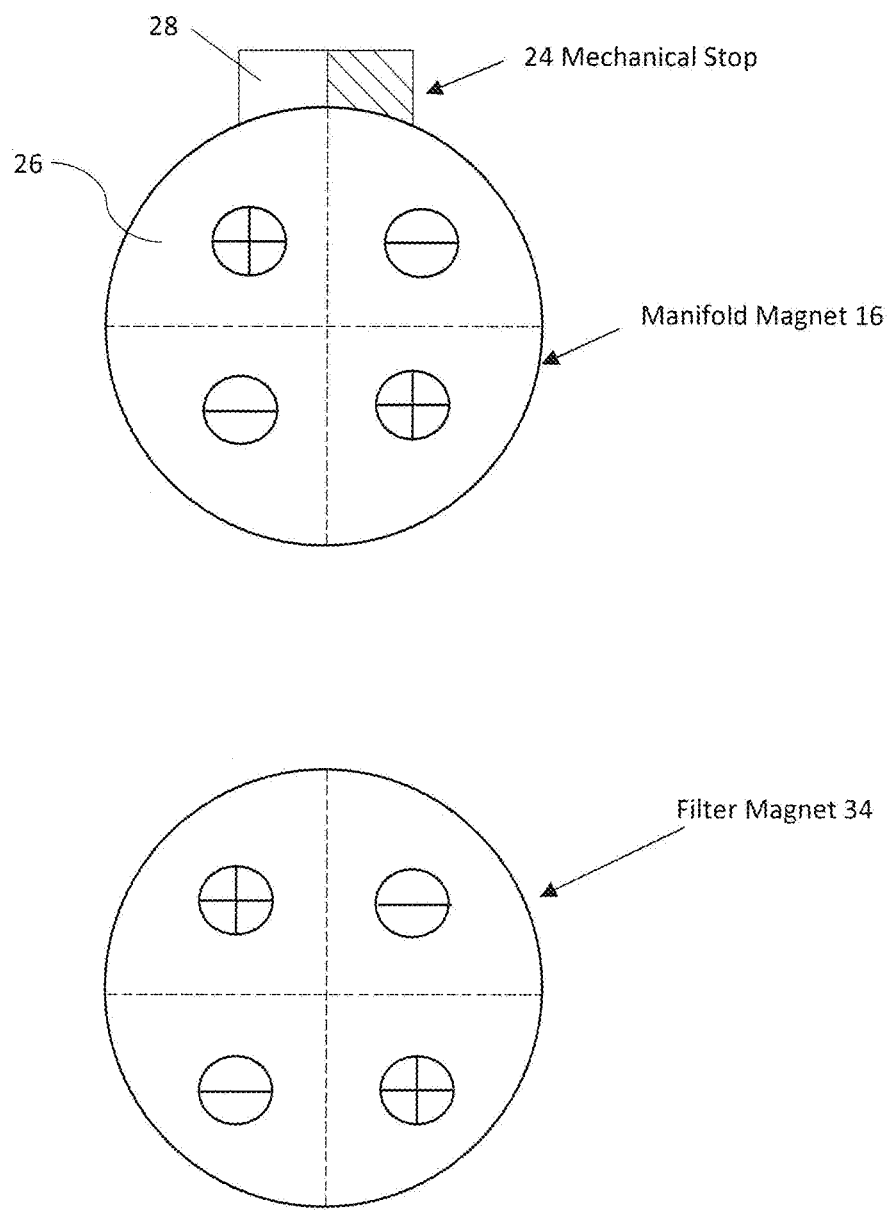
FIG. 6C depicts the magnet orientation at the EJECTION position.

FIG. 6 depicts the interim status of the system when, from the ON state, it becomes necessary to replace and therefore eject filter cartridge 30. Filter cartridge 30 is rotated from an endmost point of alignment rail 20d (FIG. 5B) back through the INSTALLED position (FIG. 4B) where filter boss 32 is in line with alignment rail 20c. At this point, as depicted in FIG. 6C, tab 28 abuts mechanical stop 24, which abutment physically prohibits any further rotation of manifold magnet 16 in the direction of arrows 23. At this juncture of the filter cartridge rotation, manifold magnet 16 stays in the "INSTALLED" position, and can rotate no further (in the direction of arrows 23).

To eject filter cartridge 30, rotation is continued, moving filter boss 32 slidably across shroud 14 to an opposite end point of alignment rail 20b. FIG. 6A depicts position indicators ⊗ out of phase with one another caused by the rotation of filter cartridge 30 when filter boss 32 is at the end point of alignment rail 20b.

FIG. 6B depicts filter boss 32 at the end point of alignment rail 20b.

As depicted in FIGS. 6B & 6C, when the filter boss 32 is located at the end point of alignment rail 20b, manifold magnet 16 remains in its INSTALLED position, while filter magnet 34 continues to rotate ninety degrees (90°) further from its INSTALLED position. This is caused by tab 28 abutting mechanical stop 24 when the filter boss 32 rotates through the INSTALLED position on its way to the "EJECTION" position.

FIG. 6C depicts the magnet orientation at this EJECTION position. The magnets are now out-of-phase with one another, and a resulting repulsion force assists in removing filter cartridge 30 from shroud 14.

Figure 7:
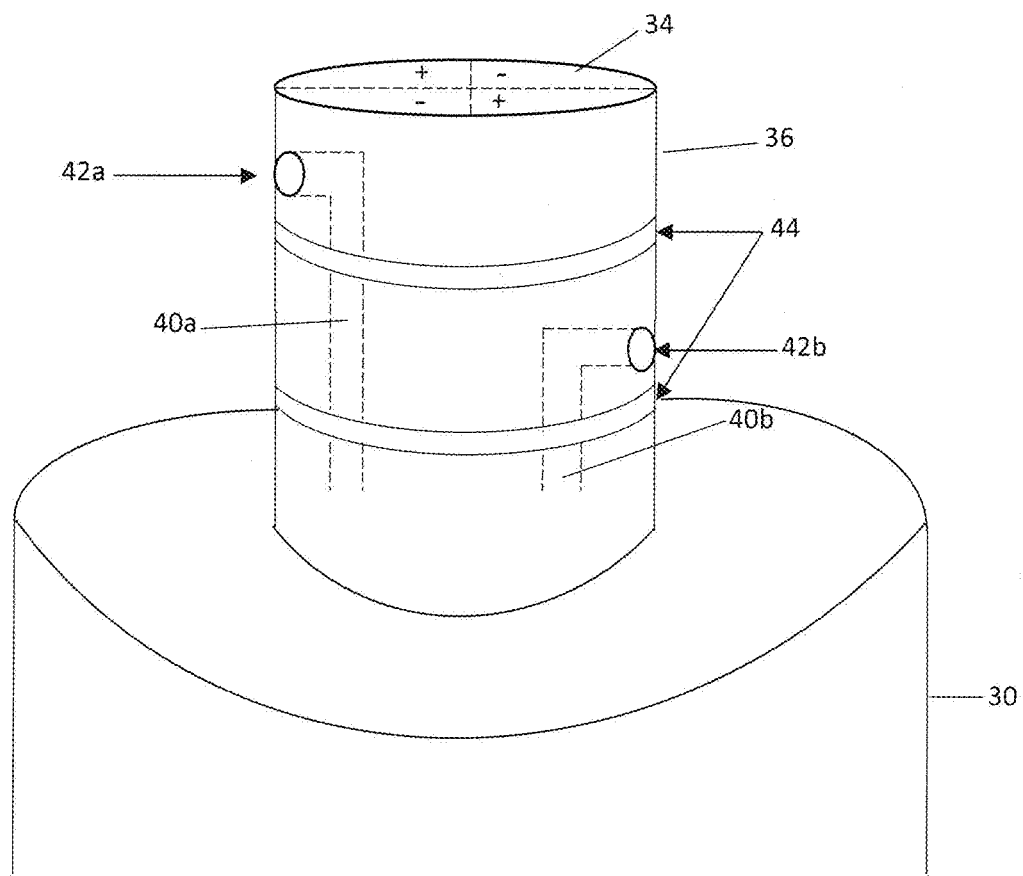
FIG. 7 depicts a top portion of filter cartridge showing a spool valve 4 within the stem portion of the cartridge.

FIG. 7 depicts a top portion perspective view of filter cartridge 30. Filter magnet 34 is shown on the top surface. Filter magnet 34 may be embedded within the stem portion 36 of the cartridge or exposed on the stem surface. A spool valve 40 is depicted within the stem portion 36 of the cartridge. Spool valve 40 includes two independent, separately located channels 40a,b for water ingress and egress. Upon rotation of filter cartridge 30, the inlet/outlet ports 42a,b of channels 40a,b, respectively, direct water flow. When the system is in the ON state, water is directed to the filter cartridge from the manifold to a first channel (which for exemplary purposes will be referred to as channel 40a), then through filter media within the filter cartridge, and ultimately exits through the second channel (e.g., 40b). This embodiment is considered a single-stem side-loaded filter design since both ingress and egress access ports are on a single filter cartridge stem and water enters and exits the stem radially inwards and outwards. Other valve configurations are possible, such as cam and poppet valves, and such valve configurations are not precluded from this design. Upon rotation in an opposite direction, the system is placed in an OFF state where channels 40a,b, and their respective inlet/outlet ports 42a,b, are not aligned with water ingress and/or egress ports on the manifold. As noted in FIG. 7, O-rings 44 may be used to keep the channel ports 42a,b separate, and out of fluid communication with one another.

Figure 8:
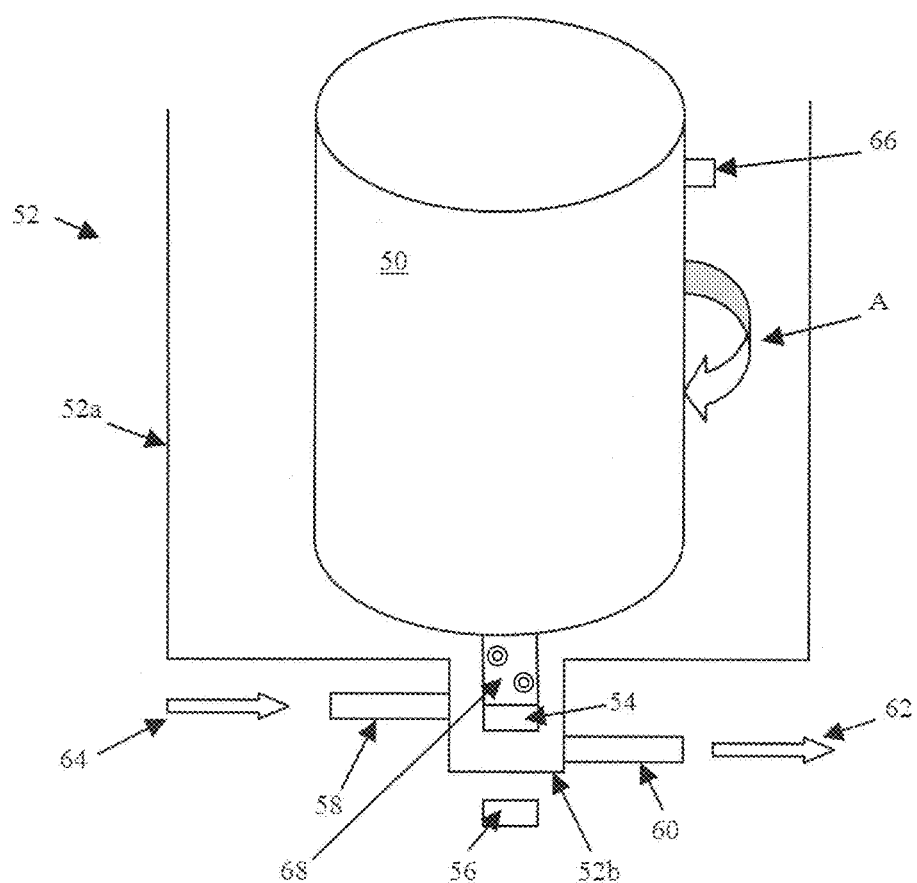
FIG. 8 depicts a second embodiment of a filtration system utilizing correlated magnets on a filter cartridge stem and on a manifold, with a filter boss following a predetermined alignment path on the manifold shroud during insertion and extraction.

FIG. 8 depicts another embodiment of the present invention having respective correlated magnets at the stem of the filter cartridge and at the base of the manifold 52, where the filter cartridge includes a boss 66 for following a path in the manifold to facilitate insertion. In this embodiment, cartridge 50 is rotatably inserted within manifold 52. A rotational direction is depicted by arrow A. Filter cartridge 50 includes a correlated magnet 54 at the end of its stem 68, which is designed to be in magnetic communication with correlated magnet 56 of manifold 52. Ingress water flows in the direction of arrow 64 into ingress channel 58, such that when filter cartridge 50 is completely inserted within the stem receiving portion 52b of manifold 52, water will flow through channel 58 into filter cartridge 50. After filtration, water will then exit filter cartridge 50 into egress channel 60 in the direction of arrow 62.

Figure 9:
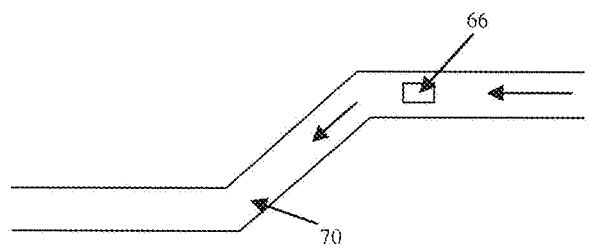
FIG. 9 depicts an alignment path thread of the manifold shroud with a filter boss located at an upper leg portion of the thread.

As depicted in FIG. 9, boss 66 is designed to follow a thread or groove 70 formed in manifold 52. Thread or groove 70 may be a spiral thread path, or as depicted a Z-thread path for boss 66 to traverse. As shown in FIG. 9, boss 66 is in the top portion of thread 70 and in this configuration the filter cartridge stem 68 is not fully inserted within stem receiving portion 52b of manifold 52. Correlated magnets 54, 56 are not aligned for either maximum attraction or maximum repulsion.

The alignment tracks are configured in a Z-shaped pattern such that the filter cartridge upon insertable rotation rotates for a first portion of an arc-turn with little or no movement in an insertion direction, then moves in the insertion direction within the shroud for a second portion of an arc-turn, and finally rotates for a third portion of an arc-turn with little or no movement in the insertion direction.

Figure 10:
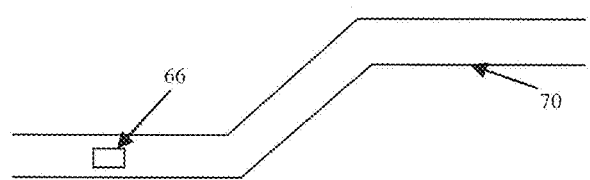
FIG. 10 depicts an alignment path thread of the manifold shroud with a filter boss located at a lower leg portion of the thread.

As the filter cartridge 50 is rotated in the direction of arrow A, boss 66 traverses down the threaded path 70 to the bottom of the path, as shown in FIG. 10, and filter cartridge stem 68 is seated within stem receiving portion 52b of manifold 52. In this position, correlated magnets 54, 56 are ultimately aligned for either maximum attraction or maximum repulsion, and magnet 56 is positioned to activate a switch 81 either mechanically or magnetically. Such a switch is capable of providing a primary function to the filter system, such as turning on the ingress water, activating an electronic circuit for parametric measurements, and/or providing a status indicator to the user, to name a few.

When magnets 54 and 56 are aligned, if they are situated for an attraction upon alignment, they will rotate together as boss 66 traverses further down threaded path 70, or as shown, along the bottom straight portion of thread 70. The subsequent rotation of the aligned magnets together will place the manifold magnet 56 in communication with switch 81 for switch activation.

Figure 11:
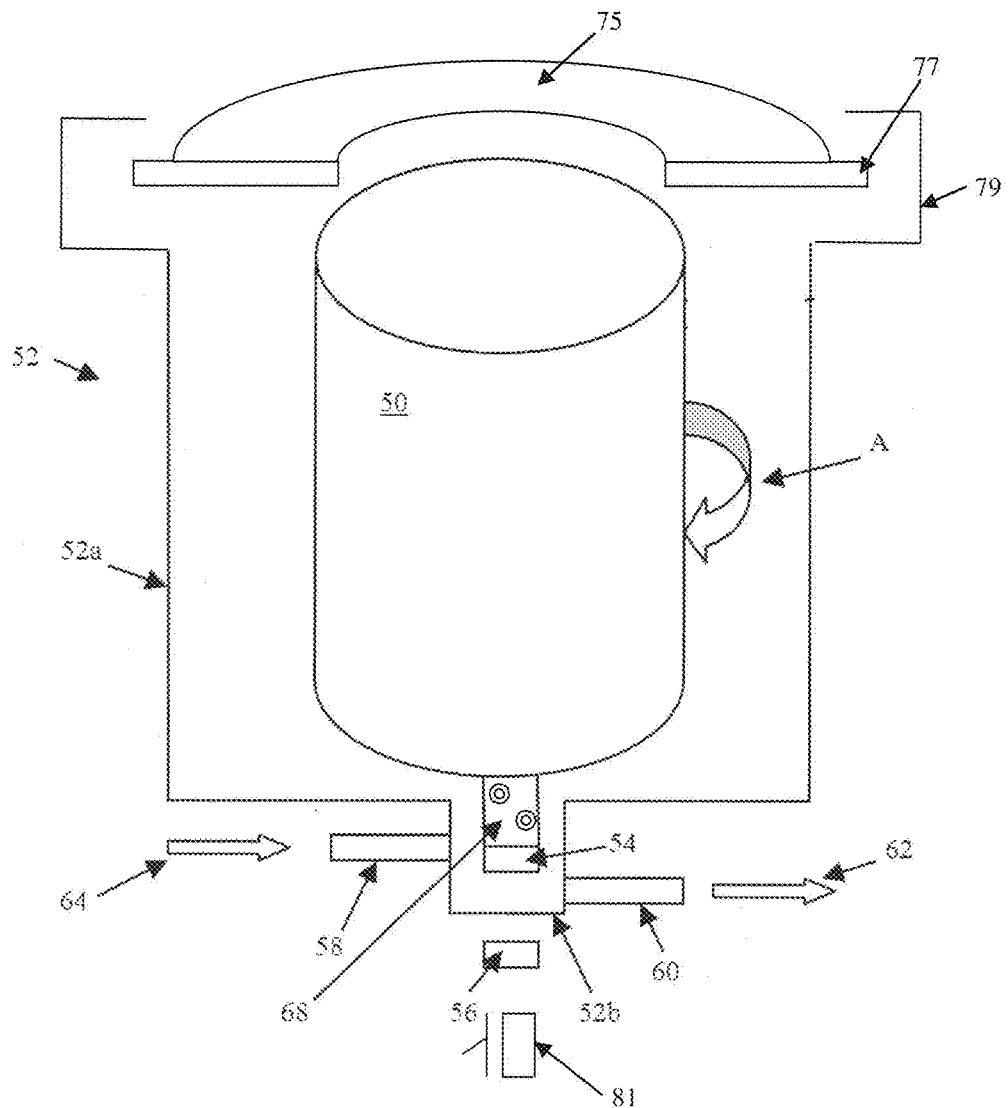
FIG. 11 depicts a third embodiment of a filtration system utilizing correlated magnets on a filter cartridge stem and on a manifold, with a lid rotatably connected to the manifold, the lid having extended lugs for following a threaded path on a manifold capture structure, where the threaded path represents a predetermined alignment path on the manifold capture structure insertion and extraction.

In an alternative embodiment, as depicted in FIG. 11, a filter cap 75 having lugs 77 is shown rotatable inserted within a manifold capture 79. Manifold capture 79 may include a threaded groove, in a similar fashion as threaded path 70. Upon rotation of filter cap 75, filter cartridge 50 and filter cartridge stem 68 are inserted within manifold cavity 52a until magnets 54 and 56 are aligned, in which case they may be capable of rotating together as the filter cartridge boss 66 further traverses down threaded path 70.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter cartridge comprising:
a housing body, said filter housing body having a side surface, and top surface with a stem extending therefrom, and a filter boss extending radially outwards from said side surface;
said stem including ingress and egress ports for fluid flow, and a filter magnet having a plurality of correlated magnets for magnetic interaction with complementary magnets on a manifold, said filter magnet positioned on a top surface of said stem or within said stem.

2. A filter cartridge comprising:
a housing body and a stem extending from a top portion of said housing body, said stem including a filter magnet embedded within said stem or exposed on a surface of said stem, such that said filter magnet is positioned to have a surface in close proximity to a manifold magnet when said filter cartridge is inserted within said manifold, said housing body including a filter boss extending radially outwards from a housing outer surface;
said filter boss aligned within an alignment track of a manifold shroud when said filter cartridge is inserted therein;
said filter magnet having a plurality of correlated magnets forming a field emission structure in magnetic communication with said manifold magnet when said filter cartridge is fully inserted within said shroud.

3. The filter cartridge of claim 1 wherein said filter magnet is embedded within said stem or exposed on a surface of said stem.

4. The filter cartridge of claim 1 wherein said filter magnet is embedded within or exposed on said stem top surface.

5. The filter cartridge of claim 1 including a spool valve with said stem having two separately located channels, one for said ingress port and the other for said egress port, said spool valve activated upon rotation.

6. The filter cartridge of claim 1 including a cam valve or a poppet valve located within said stem.

7. The filter cartridge of claim 1 including at least one O-ring situated circumferentially about said stem, and separating said ingress port from said egress port.

8. The filter cartridge of claim 2 wherein said stem covers said filter magnet, such that said filter magnet is separated from external elements by a physical barrier, said filter magnet in proximity but not in physical contact to said manifold magnet when said filter magnet is inserted within said shroud.

9. The filter cartridge of claim 2 wherein said filter magnet includes a field emission structure having multiple magnetic field emission sources situated at predetermined positions and having polarities relating to a predefined spatial force function that corresponds to said field emission structure.

\* \* \* \* \*